3,330,856
VICINAL SULFOCARBAMATE ESTERS
George L. Broussalian, Overland, Mo., assignor to Monsanto Company, St. Louis, Mo., a corporation of Delaware
No Drawing. Filed Jan. 21, 1963, Ser. No. 252,598
9 Claims. (Cl. 260—471)

This invention relates to novel compounds that are useful as general purpose surfactants (surface active agents) and detergents, and particularly as lime soap dispersants; to novel compositions that contain these compounds; and to processes for both manufacturing and using these novel compounds and compositions. More particularly, this invention relates to novel vicinal sulfo-carbamate type compounds and to processes and compositions relating to their use.

Lime soap dispersants are ordinarily synthetic surface active agents which, when used in conjunction with soap in hard water, literally cause the "lime soap" curds that form (when soap reacts with the "hardness" ions such as calcium, magnesium, and iron in the hard water to form a water-insoluble, ordinarily sticky curd that normally rises to the surface of the water) to remain largely dispersed through the water, and/or eliminate most of the normal stickiness of the curds, so that those that are formed do not stick to the surfaces of sinks, bathtubs, and the like in an undesirable manner.

It is a primary object of this invention to provide novel organic surface active agents that can be used advantageously as general purpose detergents.

It is another primary object of this invention to provide lime soap dispersants and novel lime soap dispersant compositions.

It is still another primary object of this invention to provide novel processes for manufacturing these novel compounds and compositions.

Other objects of the present invention will become apparent from the following discussion of the compounds, compositions, and processes of this invention. The novel vicinal sulfo-carbamate type compounds of the present invention comprise those compounds having the formula (1)
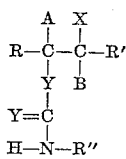

wherein R and R' are selected from the group consisting of hydrogen and certain hydrophobic, lipophylic radicals containing from 1 to 22 carbon atoms, R and R' having a combined total of from 8 to 30 carbon atoms; R" is selected from the group consisting of hydrogen and phenyl, lower alkyl and halogen-substituted lower alkyl radicals; A and B are selected from the group consisting of hydrogen, halogens, lower alkyl radicals and halogen-substituted lower alkyl radicals; Y is a chalkogen having an atomic weight below about 33; and X is selected from the group consisting of alkali metal sulfate, alkali metal sulfonate, alkaline earth metal sulfate, alkaline earth metal sulfonate, ammonium sulfate, ammonium sulfonate, sulfonic acid (—SO$_3$H), and sulfuric acid (—OSO$_3$H)

radicals.

When R or R', or both R and R' in Formula 1, above, are organic radicals, they can be branched or unbranched to practically any degree, although it is generally preferred that they be substantially unbranched (straight-chain) and contain a combined total of from about 8 to about 30 carbon atoms. Still further preferred are those radicals represented by R and R' that are in the class in which the total number of carbon atoms contained therein (i.e., in R plus R') is from about 12 to about 22. R and R' should also preferably be not substantially more susceptible to hydrolytic and thermal degradation than are the carbamate-type linkages in the compounds.

Particularly preferred are the compounds represented by Formula 1, above, wherein one of R and R' is hydrogen. Thus, it is particularly preferred that the vicinal carbamate-type groups

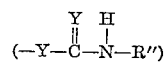

and sulfo groups ["sulfo groups" herein meaning sulfonic acid (—SO$_3$H), sulfuric acid (—OSO$_3$H), sulfate (—OSO$_3$M), and sulfonate (—SO$_3$M) groups] be attached to two adjacent carbon atoms at the end of the hydrophobic lipophylic organic radical. The significance of M in groups or radicals such as these is detailed below. For example, the particularly preferred sulfonate-carbamate type compounds of this invention include those having the structure illustrated in Formula 4:

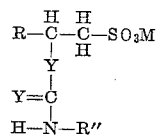

Also, it is particularly preferred that Y is oxygen.

When X in Formula 1, above, is a sulfate group (—OSO$_3$M) or a sulfonate group (—SO$_3$M), M is a cation; usually either an alkali metal cation, an alkaline earth metal cation, or NH$_4$; although M can also be an organic cation having a molecular weight too low to cause the resulting sulfonate salt to be insoluble in water, such as those primary and secondary lower alkyl amines and lower alkylol amines and the like having molecular weights below about 150, and preferably below about 110. Preferably, M is an alkali metal cation. Of these, sodium and potassium are still further preferred.

When R" is an organic radical it is a lower alkyl group or a halogen-substituted lower alkyl group, wherein the lower alkyl group contains from 1 to 5 carbon atoms, and still further preferred that when R" is a lower alkyl group, R" be straight-chain in nature.

Typical, non-limiting examples of the vicinal carbamate-type sulfate and sulfonate compounds of the present invention include those wherein R and/or R' (in Formula 1, above), are alkyl (for example, methyl, hexyl, decyl, tetradecyl, octadecyl, and the like), (where the foregoing limitations on number of carbon atoms, and hydrophobicity should also be observed), and include such compounds as those having the formulae:

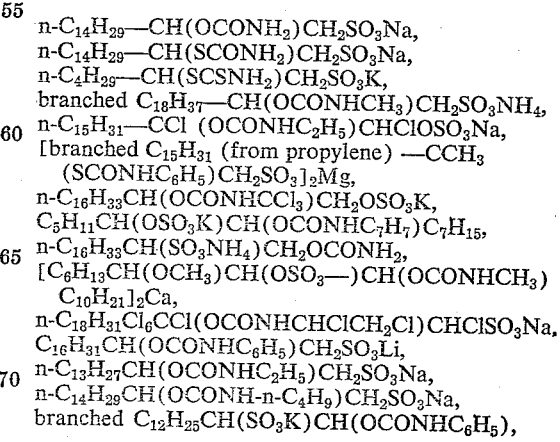

[n-C$_{14}$H$_{29}$CH(OSO$_3^-$)CH(OCONHC$_5$H$_6$)
    CH$_2$SCH$_3$]$_2$Mg,
n-C$_{22}$H$_{45}$CH(OCONHC$_2$H$_5$)CH(SO$_3$Na)OCOCH$_3$,
[n-C$_{14}$H$_{29}$CH(OCONHC$_7$H$_7$)CH$_2$SO$_3$]$^-$[NH$_3$C$_4$H$_9$]$^+$,
[n-C$_{12}$H$_{25}$CH(SCONH-n-C$_3$H$_7$)CH$_2$OSO$_3$]$^-$
    [H$_2$N(C$_2$H$_4$OH)$_2$]$^+$, and the like.

The vicinal sulfo-carbamate type compounds of this invention can be utilized advantageously as general purpose detergent active ingredients, either alone or in combination with practically any material with which they are compatible in aqueous solutions and systems and that can be conventionally employed in combination with known anionic surface active agents such as soap and the alkali metal alkylaryl sulfonates such as, for example, sodium dodecylbenzene sulfonate, potassium toluene sulfonate, and sodium decyl sulfonate. The types of materials that can be employed in the formulation of so-called "built" heavy-duty detergents and light-duty detergent compositions, liquid heavy-duty and light duty detergents, flaked, powdered, and granulated soap compositions (including such materials as other surface active materials, polyphosphate complexing agents and other builders such as the alkali metal aminoalkylene phosphonates, antiredeposition agents, optical brighteners, bleaching agents, fabric softeners, and the like) are well known in the detergent art and need not be detailed here. It should be noted, however, that the vicinal sulfo-carbamate-type compounds of this invention can be advantageously utilized in practically any of these types of formulations or compositions, in which conventional anionic surfactants such as, for example, the water-soluble alkylarylsulfonates mentioned heretofore can be utilized. In order to utilize the compounds of this invention ultimately as general purpose surface active agents, the compounds need merely be dissolved in effective amounts, generally at concentrations of from about 0.005 weight percent or more, up to about their solubility limits, in water or the aqueous system(s) in which they are utilized, and either in the presence of or in the absence of the other ingredients that can be present in the compositions mentioned in this paragraph.

The vicinal carbamate-type sulfates and sulfonates of the present invention, however, surprisingly, have properties that make them particularly outstanding lime soap dispersants. Therefore, their use as lime soap dispersants constitutes a particularly preferred embodiment of this invention. Generally, for use as a lime soap dispersant, the vicinal carbamate-type sulfonates and sulfates (preferably the sodium salts, but other alkali metal salts such as potassium and lithium salts or even ammonium salts, as well as the alkaline earth salts such as calcium and magnesium salts, and other water-soluble salts, can be used) can be blended with any conventional soap (for example, one which is intended to be utilized as a personal or laundry bar soap, or ultimately in the form of soap "flakes" or "powder" for laundering purposes), prior to the time the soap is formed into the bar, or before it is ground or flaked to yield the final soap composition. Any amount of the preferred vicinal carbamate-type sulfonate, and/or sulfate and especially amounts above about 1 weight percent (based on the amount of soap in the soap composition into which the compounds of this invention are blended) has a beneficial effect on the lime soap curd that forms when the soap composition is dissolved in hard water. However, it is generally preferred that, in combination with a soap (i.e., the alkali metal salt of a fatty acid), between about 5 and about 70 weight percent of one of the vicinal carbamate-type sulfonates or vicinal carbamate-type sulfates described above be utilized. Actually, because they are generally solid at room temperature, and generally at temperature through about 50° C. have a "soapy" feel, and dissolve relatively slowly (after they are initially compressed into a "bar" shape) when they are allowed to stand in water, these preferred compounds can even be utilized alone as detergents in the form of bars, flakes, chips, granules, etc., if desired.

The following Table I illustrates some of the benefits that can result from utilizing the vicinal sulfo-carbamate type compounds of the present invention as lime soap dispersants. The lime soap dispersant test is one that involves the measurement of the relative stickiness of lime soap scum or curds. Lime soap curds are those that form at the surface of hard water after a soap has been dissolved therein. Effective lime soap dispersants decrease or minimize the stickiness of the lime soap curds. In the test, which is conducted at a temperature between 30 and 35° C., 250 parts per million hard water (calculated as CaCO$_3$) having a Ca:Mg ratio of 2:1 is utilized. Five mls. of a 1 weight percent soap solution (or soap-lime soap dispersant blend) are shaken vigorously in a 50 ml. test tube. Then the resulting foam is immediately stirred slowly into 500 mls. of the hard water in a 600 ml. beaker. After all of the foam is quenched and the solution has stood undisturbed for 2 hours, the amount and particle size of scum, or suspended lime soap curd, are observed and rated in comparison with soap alone and a standard soap-lime soap dispersant composition. Soap gives a low rating of 10, while the standard lime soap dispersant composition is rated 3 in a test such as that just described.

Dispersant in the following table means lime soap dispersants tested as a 15 weight percent blend of the dispersant with 85 percent of sodium tallow soap.

*Table I.—Lime soap dispersancy test data*

| Dispersant: | Rating |
|---|---|
| Soap (control) | 10 |
| (1) n-C$_{14}$H$_{29}$—CH(OCONH$_2$)CH$_2$SO$_3$Na | 1 |
| (2) n-C$_{14}$H$_{29}$—CH(SCONH$_2$)CH$_2$SO$_3$Na | 2 |
| (3) n-C$_{14}$H$_{29}$—CH(SCSNH$_2$)CH$_2$SO$_3$K | 3 |
| (4) branched C$_{18}$H$_{37}$—CH(OCONHCH$_3$)CH$_2$SO$_3$NH$_4$ | 4 |
| (5) n-C$_{15}$H$_{31}$—CCl(OCONHC$_2$H$_5$)CHClOSO$_3$Na | 4 |
| (6) [branched C$_{15}$H$_{31}$ (from propylene)—CCH$_3$—(SCONHC$_6$H$_5$)CH$_2$SO$_3^-$]Mg | 6 |
| (7) n-C$_{16}$H$_{33}$CH(OCONHCCl$_3$)CH$_2$OSO$_3$K | 3 |
| (8) C$_7$H$_{15}$OC$_7$H$_{14}$CH(OCONHCH$_3$)CH(SO$_3$Na)CH$_3$ | 5 |
| (9) C$_5$H$_{11}$CH(OSO$_3$K)CH(OCONHC$_7$H$_7$)C$_7$H$_{15}$ | 5 |
| (10) n-C$_{16}$H$_{33}$CH(SO$_3$NH$_4$)CH$_2$OCONH$_2$ | 3 |
| (11) [C$_6$H$_{13}$CH(OCH$_3$)CH(OSO$_3^-$)CH(OCONHCHE)C$_{10}$H$_{21}$]$_2$Ca | 5 |
| (12) n-C$_{18}$H$_{31}$Cl$_6$CCl(OCONHCHClCH$_2$Cl)CHClSO$_3$Na | 4 |
| (13) C$_{16}$H$_{31}$CH(OCONHC$_6$H$_5$)CH$_2$SO$_3$Li | 3 |
| (14) n-C$_{13}$H$_{27}$CH(OCOHC$_2$H$_5$)CH$_2$SO$_3$Na | 2 |
| (15) n-C$_{14}$H$_{29}$CH(OCONH-n-C$_4$H$_9$)CH$_2$SO$_3$Na | 1 |
| (16) branched C$_{12}$H$_{25}$CH(SO$_3$K)CH$_2$(OCONHC$_6$H$_5$) | 3 |
| (17) [n-C$_{14}$H$_{29}$CH(OSO$_3^-$)CH(OCONHC$_6$H$_5$)CH$_2$SCH$_3$]$_2$Mg | 4 |
| (18) n-C$_{22}$H$_{45}$CH(OCONHC$_2$H$_5$)CH(SO$_3$Na)OCOCH$_3$ | 4 |
| (19) p-O$_2$NC$_6$H$_4$(CH$_2$)$_8$CH(OCSNHC$_7$H$_7$)CH$_2$SO$_3$K | 4 |
| (20) C$_{10}$H$_7$CH(OSO$_3$NH$_4$)CH(OCONHC$_7$H$_7$)C$_6$H$_{13}$ | 5 |
| (21) [n-C$_{14}$H$_{29}$CH(OCONHC$_7$H$_7$)CH$_2$SO$_3$]$^-$[NH$_3$C$_4$H$_9$]$^+$ | 4 |
| (22) [n-C$_{12}$H$_{25}$CH(SCONH-n-C$_3$H$_7$)CH$_2$OSO$_3$]$^-$[H$_2$N(C$_2$H$_4$OH)$_2$]$^+$ | 4 |

Although the vicinal carbamate sulfate and sulfonate compounds of this invention can be manufactured via more than one process, it has been found that one of the most advantageous of these involves the inter-reaction of a vicinal sulfo hydrochalkogen compound having the formula (5)

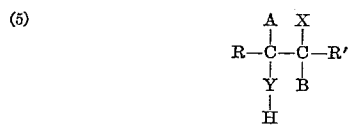

(wherein R, R', A, B, Y, and X have the same meaning as in Formula 1, above), with an appropriate isocyanate-type compound such as those illustrated in Formula 6:

(6) $\qquad$ R''—N=C=Y (wherein R'' and Y have the same meaning as in Formula 1, above).

Ordinarily the inter-reaction of the vicinal sulfo hydrochalkogen compound(s) (illustrated by Formula 5) with one or more of the isocyanate-type compounds (illustrated by Formula 6) can be accomplished by simply intermixing these materials and subjecting the resulting mixture to reaction conditions, whereby the following reaction takes place:

(I)
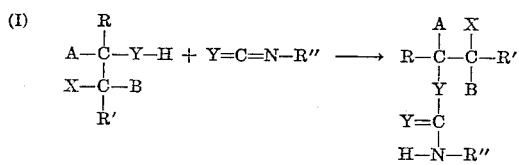

Although the reaction illustrated in Equation I, above, can be accomplished by simply intermixing the appropriate raw materials at room temperature and maintaining the temperature of the resulting mixture at about 25–30° C. for sufficient period of time for the desired reaction to occur to at least a measureable extent, it is generally preferred that a mixture of the reactants be subjected to elevated temperatures of from about 50 to about 150° C. or more in order to minimize the reaction time. This reaction can also be performed in the presence of a basic organic catalyst such as pyridine, triethylamine, tributylamine, and the like, preferably in the substantial absence of water, and/or in one or more solvents in which the reactants are soluble, such as ethers, halogenated hydrocarbons, and aromatic hydrocarbons. Typical suitable solvents include benzene, toluene, xylene, ethyl ether, carbon tetrachloride, carbon disulfide, ligroin, ethylene dichloride, ethylene dibromide, perchloroethylene, and the like.

Typical, non-limiting, examples of vicinal hydroxy sulfonate and sulfate compounds that can be used as "raw" materials in the above-described process include sodium 1-hydroxy-9,10-dichloro-2-n-octadecanesulfonate, sodium 2-hydroxy - 1-n - hexadecanesulfonate, potassium 3 - hydroxy - 2 - n - tetradecanesulfonate, sodium 2-hydroxy-1-n-perfluorododecanesulfonate, potassium 7-hydroxy-8-n - hexadecanesulfate, vicinal sodium 6 - hydroxy-branched) hexadecanesulfonate, magnesium 1-hydroxy-10-bromo-2 - n - octadecanesulfonate, calcium 1 - carboethoxy - 8 - hydroxy - 9 - n - heptadecanesulfate, sodium 2- hydroxy-3-decalinsulfonate, magnesium 1 - ethyl - 1- hydroxy - 2 - (branched) octadecanesulfonate, potassium 1-ethoxy-7-hydroxy-8-hexadecanesulfonate, sodium 4-hydroxy - 3 - n - tetradecanesulfate, sodium 4-hydroxy-3-n-tetradecanesulfonate, sodium 2, 7 - dimethyl - 5 - hydroxy-4-n-decanesulfonate, sodium 4 - hydroxy - 5 - n-hexadecanesulfonate, potassium 1 - hydroxy - 2 - sulfato-5,6-dodecene, sodium 1-hydroxy-2 - n - decanesulfate, disodium 2-hydroxy-1,3-n-tetradecanedisulfonate, sodium 2-hydroxy-1-hexadecanesulfate, magnesium 2-hydroxy-1-n-tetradecanesulfate, as well the corresponding mercapto compounds, wherein, in each of the foregoing typical examples, the hydroxy group is replaced by a mercapto (—SH), sometimes called a "sulfhydryl," group.

Typical, non-limiting examples of the isocyanate-type compounds that can be used as "raw" materials for the manufacture of the novel vicinal sulfo-carbamate type compounds of the present invention include, methyliso- cyanate, ethylisocyanate, n-propylisocyanate, isopropylisocyanate, n-butylisocyanate, t-butylisocyanate, n-amylisocyanate, isoamylisocyanate, cyclobutylisocyanate, 2-isocyanato-n-pentane, ethylenediisocyanate, isohexylisocyanate, n-heptylisocyanate, phenyl isocyanate, benzyl isocyanate, 1,2-cyclohexane diisocyanate, 1-phenylisopropylisocyanate, B-phenylethylisocyanate, 3-methylbenzylisocyanate, 2-methylbenzylisocyanate, 3,5-dimethylbenzylisocyanate, and the like, as well as those compounds which correspond to the foregoing typical examples, wherein the O in the isocyanate group is replaced with an S.

In the following additional examples which are illustrative of some of the preferred embodiments of the present invention, all parts are by weight unless otherwise specified.

EXAMPLE 23

Into a mixture of 500 parts of sodium 2-hydroxy-1-n-hexadecanesulfonate and 10,000 parts of toluene, all in a conventional glass-lined reaction vessel fitted with an efficient stirrer, are blended 1500 parts of n-butyl isocyanate. The resulting blend is then heated at reflux temperature for a period of 30 minutes, then cooled to about 30° C., and filtered. The resulting filtrate is then stripped of solvent and unreacted isocyanate material in vacuo. The residue, after recrystallization from a 1:1 mixture of benzene and acetone is the desired product, about 520 parts of sodium 1-sulfo-n-hexadecyl-2-N-normal butyl carbamate. The colorless product, identified by chemical and infra-red analyses, is an excellent lime soap dispersant and general purpose detergent.

EXAMPLE 24

Example 23 above, is repeated, except that the sodium 2-hydroxy-1-hexadecanesulfonate is replaced with 520 parts of potassium 2-mercapto-1-n-hexadecanesulfonate. The residue resulting from the solvent stripping step consists almost entirely of the desired product, potassium 1-sulfo-n-hexadecyl-2-N-n-butyl thiolcarbamate.

EXAMPLE 25

Example 23, above, is repeated, except that the isocyanate is replaced with 1000 parts of N-phenyl isothiocyanate. The product resulting therefrom, sodium 1-sulfo-n-hexadecyl-2-N-phenyl thionocarbamate is an excellent lime soap dispersant.

Any of the above-described vicinal hydroxy- or mercapto-sulfate or sulfonate compounds can be reacted with any of the isocyanate or isothiocyanate compounds described above in a process such as that detailed in Example 23, above. Thus, generally all that is necessary to manufacture any of the compounds of the present invention is that the appropriate vicinal hydroxy or mercapto sulfo or sulfato compound be intermixed with an appropriate isocyanate or isothiocyanate compound (preferably in a suitable non-reactive solvent) at a convenient reaction temperature.

What is claimed is:
1. A compound having the formula

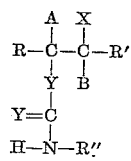

wherein R and R' are selected from the group consisting of hydrogen and alkyl, olefinic radicals and halogen substituted alkyl radicals, containing a combined total of from 8 to 30 carbon atoms; R'' is selected from the group consisting of hydrogen and phenyl, lower alkyl and halogen-substituted lower alkyl radicals; A and B are selected from the group consisting of hydrogen, halogens, lower alkyl radicals and halogen-substituted lower alkyl radicals; Y is a chalkogen selected from the group consisting of O and S and X is selected from the group consisting of alkali metal sulfate, alkali metal sulfonate, alkaline earth metal sulfate, alkaline earth metal sulfonate, ammonium sulfate, ammonium sulfonate, sulfonic acid and sulfuric acid radicals.

2. A compound having the formula

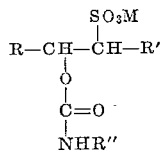

wherein R and R' in each instance are selected from the group consisting of hydrogen and alkyl radicals, the total number of carbon atoms in R plus R' being from about 12 to about 22, R" is selected from a group consisting of hydrogen, phenyl, and lower alkyl radicals, and M represents an alkali metal cation.

3. A compound as in claim 2 wherein R" represents a phenyl group.

4. A compound as in claim 2 wherein R" represents a lower alkyl group.

5. A compound as in claim 2 wherein R' represents hydrogen.

6. A compound as in claim 5 wherein R represents a normal alkyl radical.

7. A sodium 1-sulfo-2-n-pentadecyl-N-ethyl carbamate.

8. Sodium 1-sulfo-2-n-hexadecyl N-n-butyl carbamate.

9. Potassium 2-sulfo-1-(branched)tetradecyl N-phenyl carbamate.

References Cited

UNITED STATES PATENTS

| | | | |
|---|---|---|---|
| Re. 24,868 | 9/1960 | Beaver et al. | 260—471 |
| 1,931,806 | 10/1933 | Ulrich et al. | 260—458 |
| 1,933,945 | 11/1933 | Ulrich et al. | 260—482 |
| 1,964,654 | 6/1934 | Ulrich et al. | 260—458 |
| 2,218,939 | 10/1940 | Steindorff et al. | 260—471 |
| 2,634,289 | 4/1953 | Butler | 260—458 |
| 2,703,810 | 3/1955 | Viard | 260—471 |
| 2,768,154 | 10/1056 | Unruh et al. | 260—471 |
| 2,798,885 | 7/1957 | Ensslin et al. | 260—482 |
| 2,855,436 | 10/1958 | Rekker. | |
| 2,967,880 | 1/1961 | Finke et al. | 260—482 |
| 2,983,684 | 5/1961 | Langdon | 252—117 |
| 3,024,197 | 3/1962 | Dohr et al. | 252—117 |
| 3,081,335 | 3/1963 | Morris et al. | 260—471 |

FOREIGN PATENTS

| | | |
|---|---|---|
| 552,758 | 6/1932 | Germany. |
| 599,692 | 7/1934 | Germany. |

CHARLES B. PARKER, *Primary Examiner.*

A. T. MEYERS, *Examiner.*

FLOYD D. HIGEL, *Assistant Examiner.*